United States Patent
Murphy et al.

(10) Patent No.: US 10,424,092 B2
(45) Date of Patent: Sep. 24, 2019

(54) MAPPING INFRASTRUCTURE LAYOUT BETWEEN NON-CORRESPONDING DATASETS

(71) Applicant: INTERNATIONAL BUSINESS MACHINES CORPORATION, Armonk, NY (US)

(72) Inventors: Liam J. Murphy, Lusk (IE); Pamela A. Nesbitt, Ridgefield, CT (US); Shane O'Sullivan, Co. Meath (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/338,722

(22) Filed: Oct. 31, 2016

(65) Prior Publication Data
US 2017/0046859 A1 Feb. 16, 2017

Related U.S. Application Data

(63) Continuation of application No. 13/647,056, filed on Oct. 8, 2012, now Pat. No. 9,552,372.

(51) Int. Cl.
G06F 16/25 (2019.01)
G06T 11/20 (2006.01)
(Continued)

(52) U.S. Cl.
CPC ............ *G06T 11/203* (2013.01); *G01C 21/26* (2013.01); *G01C 21/30* (2013.01); *G01C 21/34* (2013.01);
(Continued)

(58) Field of Classification Search
USPC ........................................................ 707/756
See application file for complete search history.

(56) References Cited

U.S. PATENT DOCUMENTS

| | | |
|---|---|---|
| 5,448,485 A | 9/1995 | Ishibashi et al. |
| 5,933,100 A | 8/1999 | Golding |

(Continued)

FOREIGN PATENT DOCUMENTS

| | | |
|---|---|---|
| CN | 1480867 A | 3/2004 |
| CN | 1997874 A | 7/2007 |

(Continued)

OTHER PUBLICATIONS

"Integrated Services Mappings for Low Speed Networks", Sep. 1, 1999, Jackowski et al, IP.com, IP.com No. IPCOM000003280D, published on the world wide web at http://ip.com/IPCOM/000003280.

(Continued)

*Primary Examiner* — Sherief Badawi
*Assistant Examiner* — Raheem Hoffler
(74) *Attorney, Agent, or Firm* — Christopher K. McLane; Paul Steven Drake

(57) ABSTRACT

A system or computer usable program product for representing a piece of a road as a first ordered series of line segments connected in an end-to-end fashion; representing the piece of the road as a second ordered series of line segments connected in an end-to-end fashion; for each given pair of two consecutive points of the second ordered series of points, determining a corresponding plurality of in-between points from the first ordered series of points; for each given line segment of the second ordered series of line segments, determining a first traffic characteristic value corresponding to the given line segment and a portion of the piece of the road which the given line segment represents; and presenting a visual representation of the piece of the road.

18 Claims, 10 Drawing Sheets

(51) Int. Cl.
   *G01C 21/30* (2006.01)
   *G01C 21/26* (2006.01)
   *G01C 21/34* (2006.01)
   *G06F 16/26* (2019.01)
   *G06F 16/29* (2019.01)
   *G06F 16/34* (2019.01)
   *G06T 11/00* (2006.01)
   *H04H 20/55* (2008.01)
   *G08G 1/0968* (2006.01)
   *G06F 16/10* (2019.01)
   *G01C 21/36* (2006.01)
   *G08G 1/123* (2006.01)

(52) U.S. Cl.
   CPC ......... *G01C 21/3492* (2013.01); *G06F 16/26* (2019.01); *G06F 16/29* (2019.01); *G06F 16/34* (2019.01); *G06T 11/001* (2013.01); *G06T 11/206* (2013.01); *G01C 21/3694* (2013.01); *G06F 16/10* (2019.01); *G06F 16/258* (2019.01); *G06T 2207/30184* (2013.01); *G06T 2207/30236* (2013.01); *G08G 1/096833* (2013.01); *G08G 1/123* (2013.01); *H04H 20/55* (2013.01)

(56) References Cited

U.S. PATENT DOCUMENTS

| | | | |
|---|---|---|---|
| 5,978,733 A | 11/1999 | Deshimaru et al. | |
| 6,058,350 A * | 5/2000 | Ihara | G01C 21/32 701/409 |
| 6,067,499 A | 5/2000 | Yagyu et al. | |
| 6,295,503 B1 | 9/2001 | Inoue et al. | |
| 6,487,305 B2 | 11/2002 | Kambe et al. | |
| 6,892,204 B2 | 5/2005 | Haas et al. | |
| 7,072,764 B2 | 7/2006 | Donath et al. | |
| 7,155,376 B2 | 12/2006 | Yang et al. | |
| 7,403,852 B2 | 7/2008 | Mikuriya et al. | |
| 7,702,457 B2 | 4/2010 | Matsunaga et al. | |
| 8,090,524 B2 * | 1/2012 | Chapman | G01C 21/3691 701/117 |
| 8,271,195 B2 * | 9/2012 | Painter | G01C 21/32 701/409 |
| 8,332,247 B1 | 12/2012 | Bailey et al. | |
| 8,392,109 B2 | 3/2013 | Liotopoulos et al. | |
| 8,538,693 B2 | 9/2013 | McBride et al. | |
| 8,650,193 B1 | 2/2014 | Pilloff | |
| 8,660,794 B2 * | 2/2014 | Currie | G01C 21/34 340/905 |
| 8,762,046 B2 * | 6/2014 | Dorum | G01C 21/32 340/995.14 |
| 9,140,566 B1 | 9/2015 | Curtis et al. | |
| 9,146,125 B2 * | 9/2015 | Vulcano | G08G 1/0969 |
| 9,214,099 B2 | 12/2015 | Usui et al. | |
| 9,228,850 B2 | 1/2016 | Singh | |
| 9,445,229 B2 | 9/2016 | Kurokawa et al. | |
| 9,552,372 B2 | 1/2017 | Murphy | |
| 9,719,795 B2 | 8/2017 | Kato | |
| 2001/0029425 A1 | 10/2001 | Myr | |
| 2002/0198694 A1 | 12/2002 | Yang et al. | |
| 2003/0005909 A1 | 1/2003 | Johann et al. | |
| 2003/0059091 A1 | 3/2003 | Kambe et al. | |
| 2003/0231190 A1 | 12/2003 | Jawerth | |
| 2004/0030492 A1 | 2/2004 | Fox et al. | |
| 2004/0054687 A1 | 3/2004 | McDonough | |
| 2004/0085227 A1 | 5/2004 | Mikuriya et al. | |
| 2004/0143385 A1 | 7/2004 | Smyth et al. | |
| 2004/0220727 A1 | 11/2004 | Adachi | |
| 2005/0143902 A1 | 6/2005 | Soulchin et al. | |
| 2005/0149251 A1 | 7/2005 | Donath et al. | |
| 2006/0111837 A1 | 5/2006 | Tauchi | |
| 2006/0197763 A1 | 9/2006 | Harrison | |
| 2006/0241858 A1 | 10/2006 | Adachi | |
| 2007/0159355 A1 | 7/2007 | Kelly et al. | |
| 2008/0103692 A1 | 5/2008 | Nomura | |
| 2008/0168089 A1 | 7/2008 | Fuchs | |
| 2009/0082967 A1 * | 3/2009 | Hara | B60H 1/00735 701/530 |
| 2009/0300053 A1 | 12/2009 | Denaro | |
| 2010/0036606 A1 | 2/2010 | Jones | |
| 2010/0185609 A1 | 7/2010 | Wright et al. | |
| 2011/0029675 A1 | 2/2011 | Yeow et al. | |
| 2011/0137907 A1 * | 6/2011 | Ikenoue | G06F 17/30241 707/740 |
| 2011/0161380 A1 | 6/2011 | Keaveny et al. | |
| 2011/0208743 A1 | 8/2011 | Baum et al. | |
| 2011/0225158 A1 | 9/2011 | Snyder et al. | |
| 2011/0264708 A1 * | 10/2011 | Smartt | G01C 21/32 707/803 |
| 2011/0280453 A1 | 11/2011 | Chen et al. | |
| 2013/0253889 A1 | 9/2013 | Baker et al. | |
| 2013/0328924 A1 * | 12/2013 | Arikan | G06T 11/20 345/629 |

FOREIGN PATENT DOCUMENTS

| | | |
|---|---|---|
| CN | 102142023 A | 8/2011 |
| JP | 2002213980 A | 7/2002 |
| JP | 2004234649 A | 8/2004 |

OTHER PUBLICATIONS

"The Cooperative Intersection Collision Avoidance System for Crossing Path Violations", Aug. 4, 2008, IP.com, IP.com No. IPCOM000173388D, published on the world wide web at http://ip.com/IPCOM/000173388.

"Holomorphic Mapping of Curve and Tangent", Jan. 9, 2009, Planetmath.org, published on the world wide web at http://planetmath.org/encyclopedia/HolomorphicMappingOfCurveAndTangent.html.

Simon Andersson, "Road Shape Modeling from Digital Map Data—and Implementation of a Map Supported Cruise Control", Master of Science Thesis, Goeteborg, Sweden, Sep. 2009.

"Thread: Plat Mapping Curve Table", Mar. 2005, Cadtutor.net, published on the world wide web at http://www.cadtutor.net/forum/showthread.php?2588-Plat-Mapping-Curve-Table.

* cited by examiner

MAPPING INFRASTRUCTURE LAYOUT BETWEEN NON-CORRESPONDING DATASETS

This application is a continuation of application Ser. No. 13/647,056 filed Oct. 8, 2012 entitled "MAPPING INFRASTRUCTURE LAYOUT BETWEEN NON-CORRESPONDING DATASETS", the disclosure of which is incorporated in its entirety herein by reference.

BACKGROUND

1. Technical Field

The present invention relates generally to mapping infrastructure, and in particular, to a computer implemented method for mapping infrastructure layout between non-corresponding datasets.

2. Description of Related Art

Mapping infrastructure such as roadways may be accomplished through various types of datasets. Often a roadway may be divided up into a set of links, each link having two endpoints that may be located spatially such as by using a geographic coordinate system of latitude and longitude. Additional data may be stored for each endpoint or link. There are two primary categories of links, known as long links and short links, which may be utilized depending on the application.

Long links are a dataset typically used for display purposes. Long links typically have two endpoints with a series of midpoints connected by segments. The segments may be represented by vectors. Long links typically require less storage than short links, yet can be rendered into finely detailed maps including apparent curves. Long links typically do not contain information other than what is needed to render maps and are sometimes referred to as shape files as a result. For example, long links typically do not include analytic information such as traffic volume or speed limits. A common type of long link data format is the esri shape file format promoted by the Environmental Systems Research Institute.

Short links are a dataset generally used for analytic purposes. That is, short links are utilized where analytics are performed on the dataset such as calculating traffic volume given road conditions. Each short link includes a start point and an end point although the endpoint may be the start point for the next link. The endpoints contain geospatial coordinates where each link generally contains one speed limit, traffic volume, road conditions, average speed, etc. These links are short enough for meaningful analytics and may be updated automatically with collections devices, sensors and other data sources. One typical format utilized for short links is TMDD (traffic management data dictionary). TMDD describes a format that represents links as a start point and an end point. The main purpose of the TMDD standard is to supply traffic data for the purpose of analytics such as traffic prediction.

SUMMARY

The illustrative embodiments provide a system and computer usable program product for representing a piece of a road as a first ordered series of line segments connected in an end-to-end fashion; representing the piece of the road as a second ordered series of line segments connected in an end-to-end fashion; for each given pair of two consecutive points of the second ordered series of points, determining a corresponding plurality of in-between points from the first ordered series of points; for each given line segment of the second ordered series of line segments, determining a first traffic characteristic value corresponding to the given line segment and a portion of the piece of the road which the given line segment represents; and presenting a visual representation of the piece of the road.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIG. 33 is a block diagram of a hybrid traffic system in accordance with a second embodiment;

FIG. 73 is a flow diagram of the operation of a hybrid traffic system in accordance with the second embodiment;

DETAILED DESCRIPTION

Figure 1:
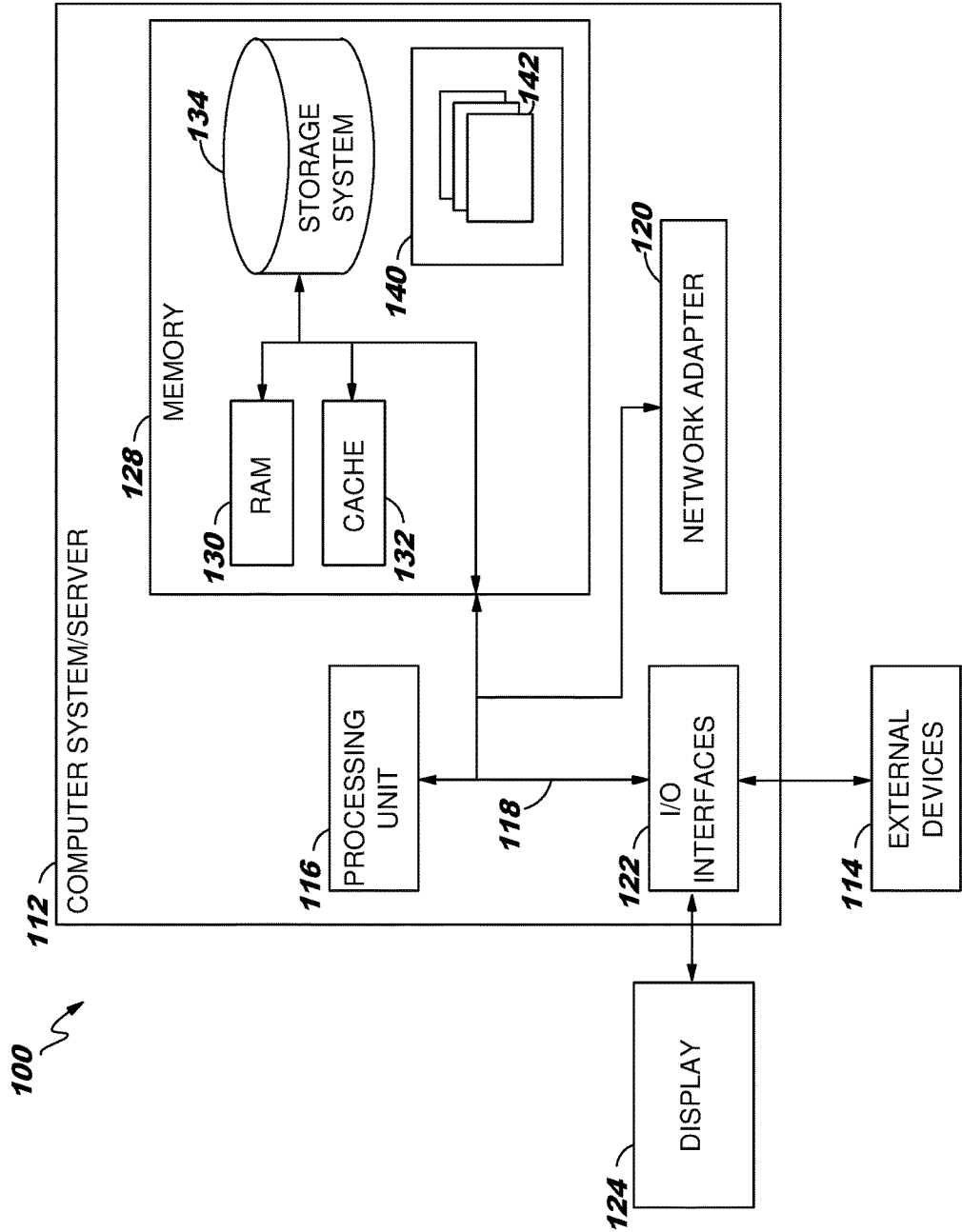
FIG. 1 is a block diagram of a data processing system in which various embodiments may be implemented.

Processes and devices may be implemented and utilized to map an infrastructure layout between non-corresponding datasets. These processes and apparatuses may be implemented and utilized as will be explained with reference to the various embodiments below FIG. 1 is a block diagram of a data processing system in which various embodiments may be implemented. Data processing system 100 is one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention. For example, a program module may be software for combining datasets.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
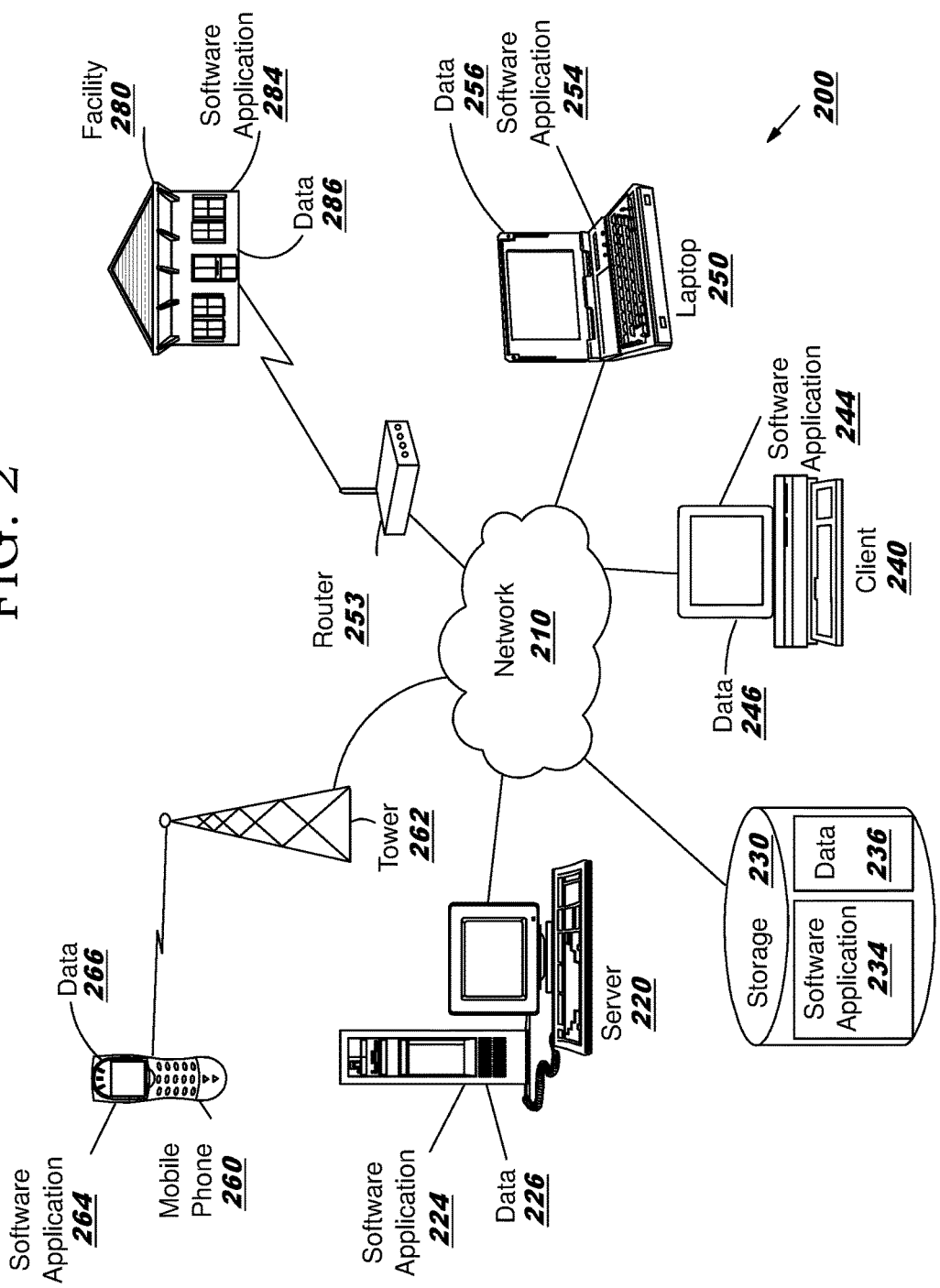
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for combining datasets or other software applications and data in accordance with embodiments described herein. Storage 230 may contain software application 234 and a content source such as data 236 for storing traffic information. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Other types of data processing systems coupled to network 210 may also include software applications. Software applications could include a web browser, email, or other software application that can combine datasets.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 may also be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. A processor and a memory may include a plurality of processing units and memory units working cohesively across a network. Data processing environment 200 may also employ a service oriented architecture where interoperable software components distributed across a network may be packaged together as coherent business applications.

Figure 3A:
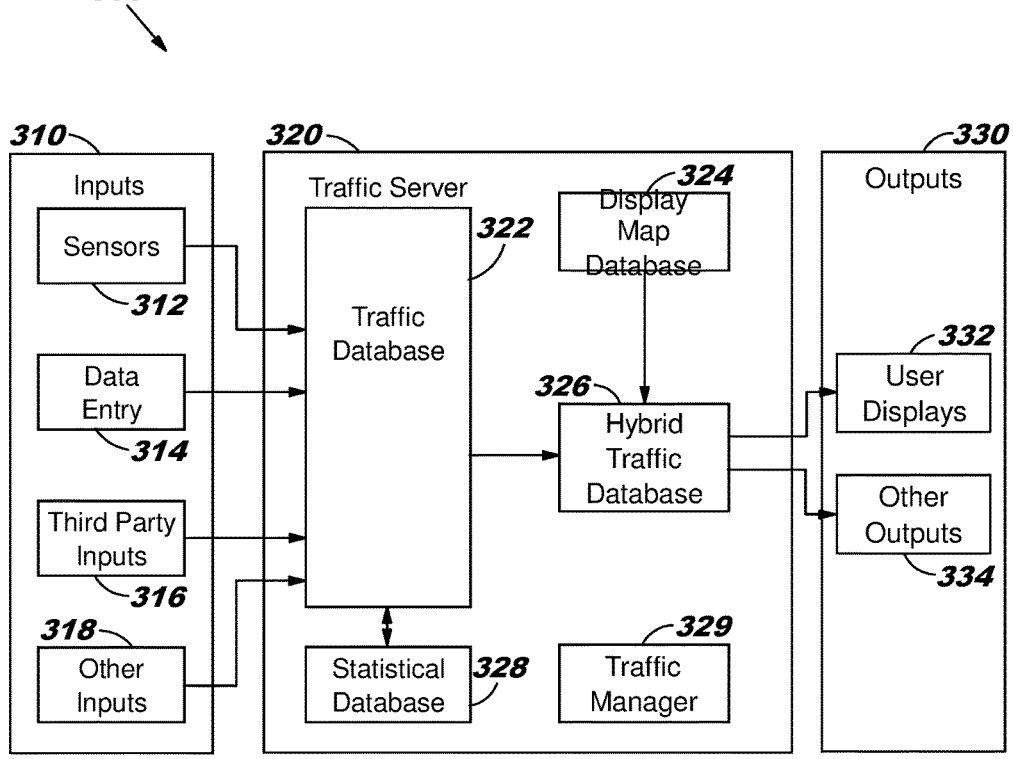
FIG. 3A is a block diagram of a hybrid traffic system in accordance with a first embodiment.

FIG. 3A is a block diagram of a hybrid traffic system in accordance with a first embodiment. Traffic system 300 may be utilized to manage and predict traffic flow across large metropolitan or other areas. Traffic system 300 includes inputs 310, a traffic server 320 and outputs 330. Inputs 310 can come from a variety of sources including sensors 312, data entry 314, third party inputs 316 and other inputs 318. Sensors 312 can include traffic cameras for identifying traffic issues as well as traffic speed and volume, road sensors, and other types of sensors for identifying relevant traffic information. Data entry 314 can include data being entered by those workers viewing traffic cameras. Third party inputs 316 can include state or local governmental authorities providing notices of traffic issues. Third party inputs can also include commercial entities providing various traffic services. Many other types of inputs may also be provided. These types of inputs are provided to a traffic server.

Traffic server 320 can include a traffic database 322, a display map database 324, a hybrid traffic database 326, a statistical database 328, and a traffic manager 329. Traffic database 322 utilizes a dataset of short links to capture and utilize traffic information such as data from inputs 310. It also may include utilize historical and statistical data from statistical database 328.

Statistical database 328 may also receive, analyze, and store information from traffic database 322. Display map database 324 includes a dataset of long links with multiple segments for displaying maps. Information from traffic database 322 is then combined periodically with information from display map database 324 to generate hybrid traffic database 326. Hybrid traffic database is then used to provide outputs to outputs 330. All of this activity within traffic server 320 may be managed by a traffic manager 329, which may be implemented in software and/or hardware.

Outputs 330 include user displays 332 and other outputs 334. Information from the hybrid traffic database may be displayed for users in a variety of formats as needed. Other outputs may include large traffic signs or other types of outputs as desired.

Figure 3B:
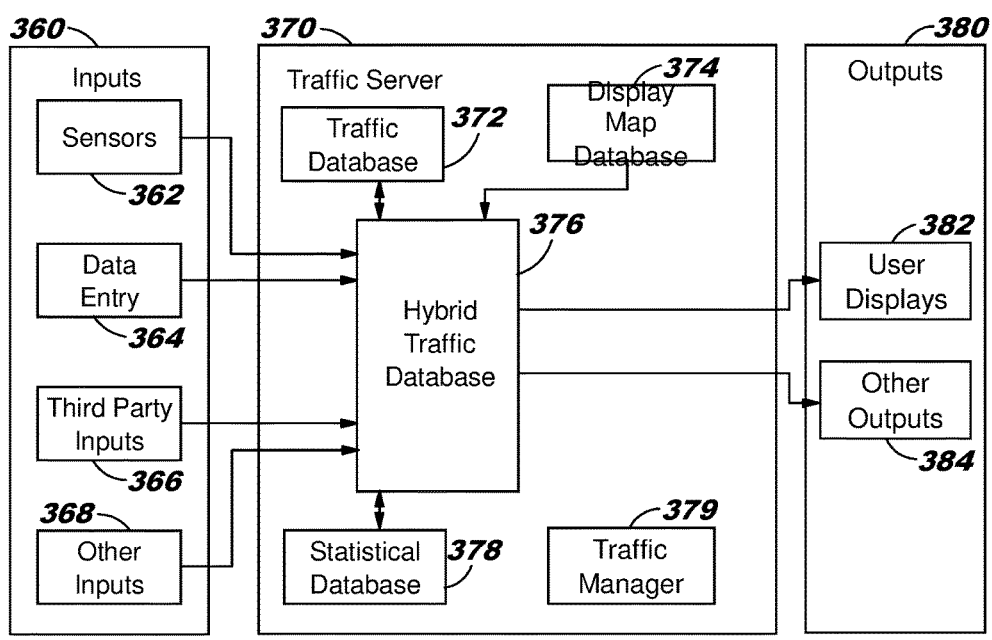

FIG. 3B is a block diagram of a hybrid traffic system in accordance with a second embodiment. This embodiment is more integrated into the traffic server than the first embodiment. Traffic system 350 may be utilized to manage and predict traffic flow across large metropolitan or other areas. In this embodiment, the use of a combined dataset is more integrated into the traffic system. Traffic system 350 includes inputs 360, a traffic server 370 and outputs 380. Inputs 360 can come from a variety of sources including sensors 362, data entry 364, third party inputs 366 and other inputs 368. Sensors 362 can include traffic cameras for identifying traffic issues as well as traffic speed and volume, road sensors, and other types of sensors for identifying relevant traffic information. Data entry 364 can include data being entered by those workers viewing traffic cameras. Third party inputs 366 can include state or local governmental authorities providing notices of traffic issues. Third party inputs can also include commercial entities providing various traffic services. Many other types of inputs may also be provided. These types of inputs are provided to a traffic server.

Traffic server 370 can include a traffic database 372, a display map database 374, a hybrid traffic database 376, a statistical database 378, and a traffic manager 379. Traffic database 372 including a dataset of short links was previously combined with a display map database 374 with a dataset of long links into a hybrid traffic database with a combined dataset. Hybrid traffic database 376 utilizes short links to capture and utilize traffic information such as data from inputs 360 while also containing long link segments from display map database 374 for displaying the resulting information. Hybrid traffic database 376 may also include and utilize historical and statistical data from statistical database 378. Statistical database 378 may also receive, analyze, and store information from hybrid traffic database 376. Hybrid traffic database is then used to provide outputs to outputs 380. All of this activity within traffic server 370 may be managed by a traffic manager 379, which may be implemented in software and/or hardware.

Outputs 380 include user displays 382 and other outputs 384. Information from the hybrid traffic database may be displayed for users in a variety of formats as needed. Other outputs may include large traffic signs or other types of outputs as desired.

Figure 4A:
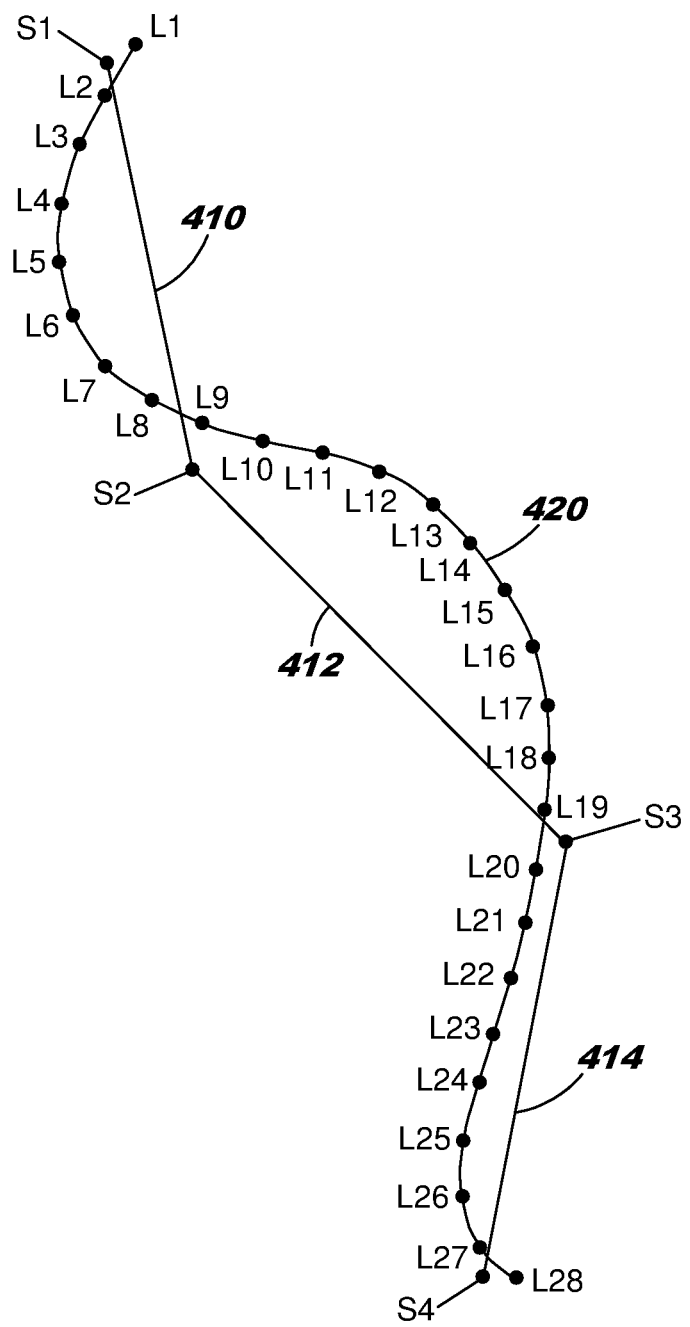
FIGS. 4A and 4B are pictorial diagrams illustrating a combination of datasets in which various embodiments may be implemented.
Figure 4B:
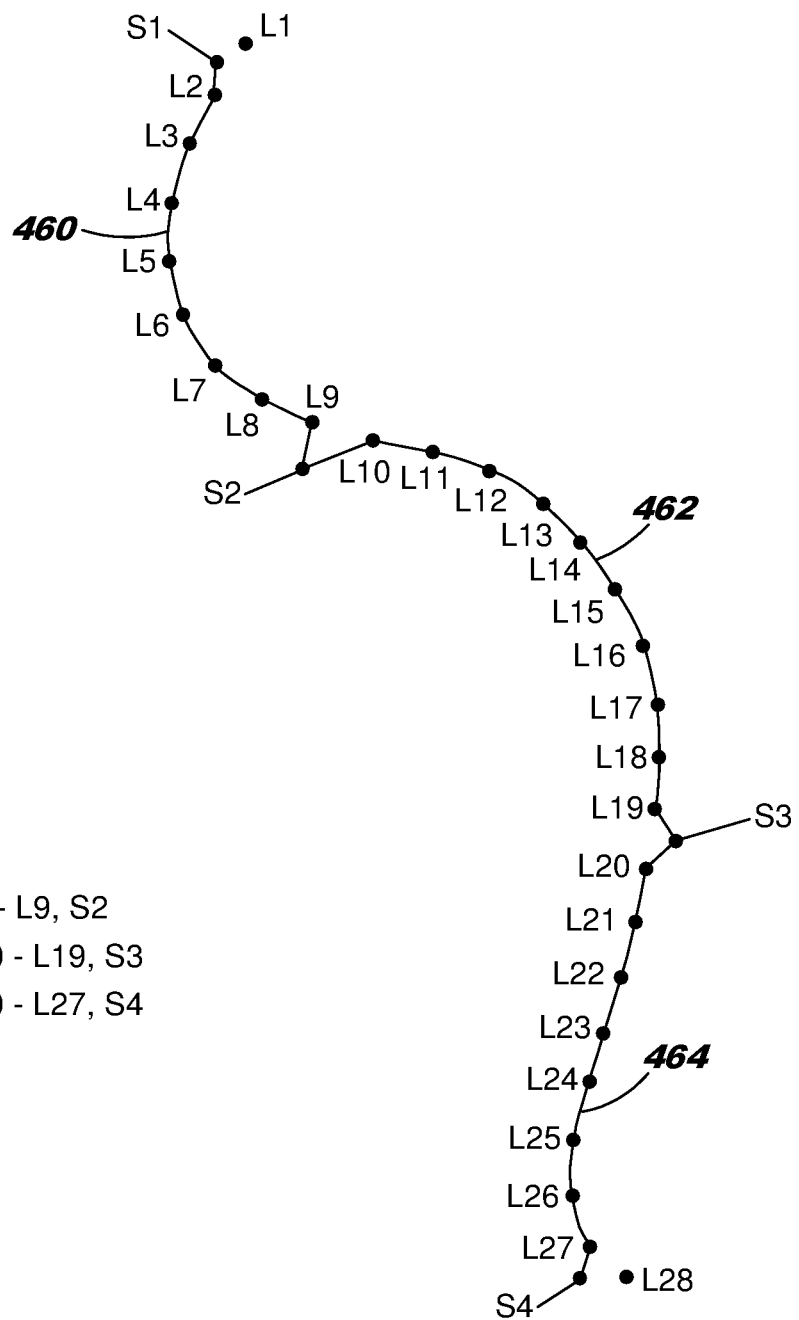

FIGS. 4A and 4B are pictorial diagrams illustrating a combination of datasets in which various embodiments may be implemented. In FIG. 4A, two sets of data are shown. There is a set of short links 410, 412 and 414 with endpoints S1, S2, S3 and S4. There is also a long link 420 shown with multiple segment endpoints L1 through L28. In this embodiment, the short links are utilized to describe the location of various geospatial linestrings such as roadways for analytic purposes. The long links are also utilized to describe the location of various geospatial linestrings such as roadways, lakes, rivers, parks, pathways, etc. for display purposes. As such, many of the same linestrings may be described by short links and long links. A linestring is an object such as described above that represents a list of connected points detailing the shape of that object. A linestring may also describe the position or location of that object and as such may be more specifically referred to as a geospatial linestring. A linestring may include multiple links.

In this example, the short links are effective for analytics purposes, but less effective for display purposes due to the straight nature of each short link. The long links are effective for display purposes due to the multiple midpoints and short segments, but less effective for analytics purposes due to the length of the long link. What is disclosed is a combination of these datasets which is useful for analytics purposes and for display purposes. In addition, the resulting combination is able to receive updated data intended for the short link dataset.

Such a combination of datasets is shown in FIG. 4B. Starting with the first endpoint S1, the closest long link midpoint L2 is added to that short link 460. Subsequent long link midpoints are also added to the short link 460 until the closet long link midpoint to the short link S2 endpoint is reached, which in this case is L9. The segment from L9 to S2 completes the first combined or hybrid short link 460. As a result, hybrid short link 460 includes points S1, L2, L3, L4, L5, L6, L7, L8, L9 and S2. Starting with endpoint S2 of short link 462, the next long link midpoint L10 is added to that short link. Subsequent long link midpoints are also added to the short link 462 until the closet long link midpoint to the short link S3 endpoint is reached, which in this case is L19. The segment from L19 to S3 completes the second combined or hybrid short link 462. As a result, hybrid short link 462 includes points S2, L10, L11, L12, L13, L14, L15, L16, L17, L18, L19 and S3. Starting with endpoint S3 of short link 464, the next long link midpoint L20 is added to that short link. Subsequent long link midpoints are also added to the short link 464 until the closet long link midpoint to the short link S4 endpoint is reached, which in this case is L27. The segment from L27 to S4 completes the third combined or hybrid short link 464. As a result, hybrid short link 464 includes points S3, L20, L21, L22, L23, L24, L25, L26, L27 and S4.

Figure 5A:
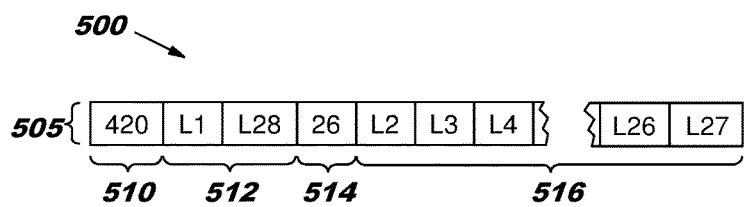
FIGS. 5A, 5B and 5C are diagrams of a long link dataset and a short link dataset combined into a hybrid link dataset as shown in FIGS. 4A and 4B above in which various embodiments may be implemented.

FIGS. 5A, B and C are diagrams of a long link dataset and a short link dataset combined into a hybrid link dataset as shown in FIGS. 4A and 4B above in which various embodiments may be implemented. This diagram could change based on the type of datasets utilized for long links and short links, although the general principles shown herein would still apply.

FIG. 5A is a diagram of a long link dataset 500 corresponding to FIG. 4A. Only one long link 505 is shown in this example, although additional long links may be easily added. A name or reference number 510 of the long link is provided to distinguish this dataset entry from other entries. In this case, the reference number from FIG. 4A is included. The geospatial locations of the long link endpoints 512 are provided. These may be in latitude and longitude format or in other formats based on the application. The number of midpoints 514 is then provided. As shown in FIG. 4A, that would be 26 midpoints. The locations of those midpoints 516 are then provided. Again, these may be in latitude and longitude format or in other formats based on the application. As can be observed, entry 505 is a variable length record based on the number of midpoints within the long link.

Figure 5B:
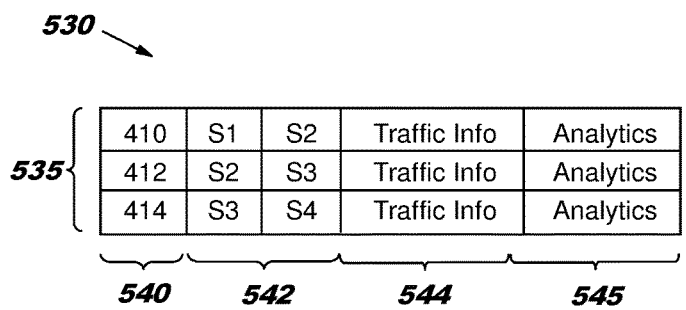

FIG. 5B is a diagram of a short link dataset 530 corresponding to FIG. 4A. Three short links 535 are shown in this example, although additional short links may easily be added. A name or reference number 540 of the short link is provided to distinguish each dataset entry from other entries. In this case, the reference numbers from FIG. 4A are included. The geospatial locations of the short link endpoints 542 are provided for each entry. These may be in latitude and longitude format or in other formats based on the application. As described above, short links do not include midpoints. A set of traffic information 544 for each short link entry is also provided. This can include a speed limit, average traffic speed, whether there are any accidents or other impediments on the short link, etc. This may be fixed length or variable length depending on the application. After analysis of the traffic information in view of prior history and statistical analysis, a set of traffic analytics 545 for each short link entry is also provided. This can include projected variables such as traffic volume, average traffic delays, etc. These variables may be fixed length or variable length depending on the application.

Figure 5C:
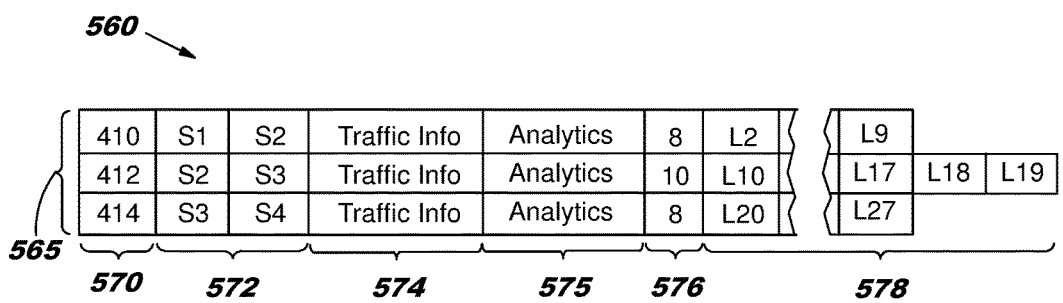

FIG. 5C is a diagram of a hybrid link dataset 560 including the data from FIGS. 5A and 5B above. Three hybrid links 565 are shown in this example corresponding to the three short links of FIG. 5B above. A name or reference number 570 of each hybrid link is provided to distinguish each dataset entry from other entries. In this case, the reference numbers from FIGS. 5A and 5B are included. The geospatial locations of the hybrid link endpoints 572 are provided for each entry. These may be in latitude and longitude format or in other formats based on the application. A set of traffic information 574 for each hybrid link entry is also provided. This can include a speed limit, average traffic speed, whether there are any accidents or other impediments on the short link, etc. After analysis of the traffic information in view of prior history and statistical analysis, a set of traffic analytics 575 for each short link entry is also provided. This can include projected variables such as traffic volume, average traffic delays, etc. The number of midpoints 576 is then provided for each hybrid link. As shown in FIG. 4B, that would be 8, 10 and 8 midpoints for each hybrid link entry. The locations of those midpoints 578 are then provided. Again, these may be in latitude and longitude format or in other formats based on the application. As can be observed, entries 565 are variable length records based on the number of midpoints within each hybrid link.

Figure 6:
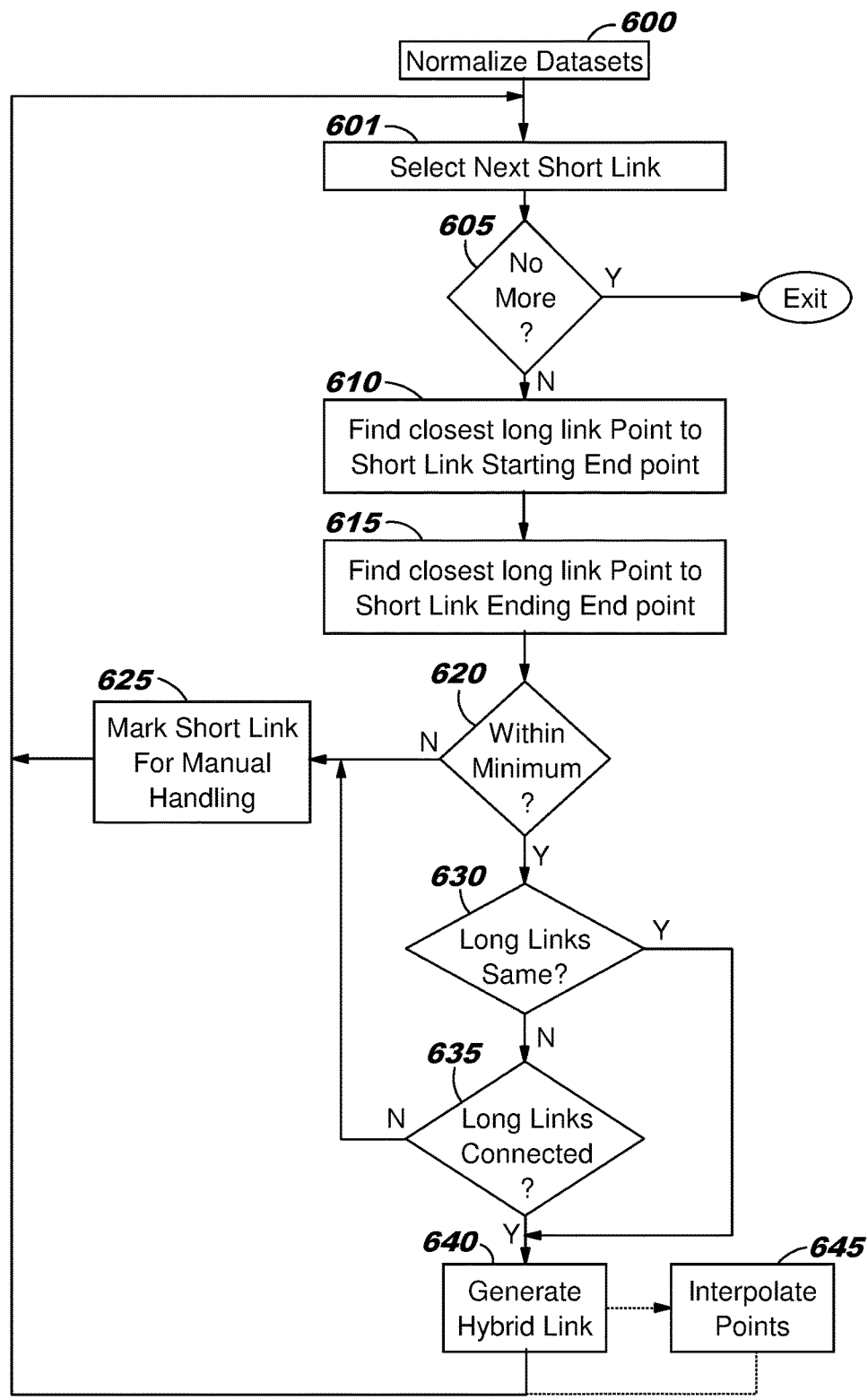
FIG. 6 is a flow diagram of a process for generating hybrid links from short links and long links in which various embodiments may be implemented.

FIG. 6 is a flow diagram of a process for generating hybrid links from short links and long links in which various embodiments may be implemented. In a first step 600, the two datasets may be normalized. That is, if the datasets utilize different scales, different coordinate systems, or other differences that can be normalized, then a normalization process is performed. Preferably the normalization would be to the long link dataset, but that is optional depending on the application. Subsequently in step 601, the next short link is selected for processing. The first time this step is performed, this would be the first short link in a short link dataset. In subsequent times this step is performed, subsequent short links will be selected until each short link is selected for processing. The short link dataset may be ordered based on reference number, starting endpoint, etc. In a second step

605, it is determined whether the final short link was already processed. If yes, then processing ceases, otherwise processing continues to step 610.

In step 610, the closest long link point (endpoint or midpoint) to the short link starting endpoint is identified. This is accomplished by comparing the geospatial coordinates of long link points to the geospatial coordinates of the short link starting endpoint. Subsequently in step 615, the closest long link point (endpoint or midpoint) to the short link ending endpoint is identified. This is accomplished by comparing the geospatial coordinates of long link points to the geospatial coordinates of the short link ending endpoint.

Subsequently in step 620 it is determined whether the identified long link points are within a minimum distance of the short link endpoints. If not, then processing continues to step 625, otherwise processing continues to step 630. This step is to address those situations where there may be a poor match between short links and long links which may be best addressed manually. In step 625, the short link is marked for manual handling and processing continues to step 601 above.

In step 630, it is determined whether the long link identified as closest to the short link starting endpoint is the same as the long link identified as closest to the short link ending endpoint. If not, then processing continues to step 635, otherwise processing continues to step 640. In step 635, it is determined whether the long link identified as closest to the short link starting endpoint is connected (shares a common endpoint) as the long link identified as closest to the short link ending endpoint. If yes, then processing continues to step 640, otherwise processing continues to step 625.

In step 640, a hybrid link is created with the endpoints and other information of the short link and the midpoints from the long link(s) identified in steps 610 and 615 above. These midpoints include the points identified as closest to the short link endpoints and any midpoints in between those identified points. An optional interpolation step 645 may be performed on the hybrid link. If there is a significant distance between two adjoining points greater than a desired minimum, then additional points may be added between the two adjoining points. Such an interpolation may include location information from additional points in the hybrid link near the two adjoining points to provide a smooth curve. Processing then returns to step 601 above for processing the next short link.

Figure 7A:
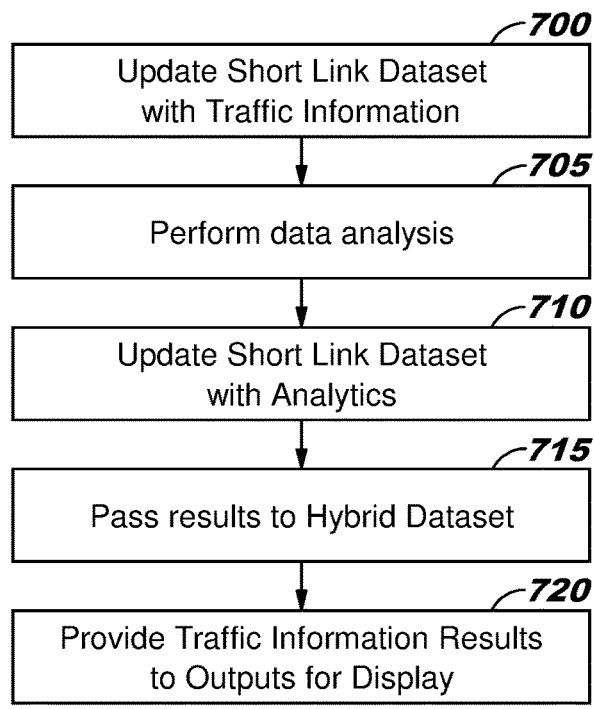
FIG. 7A is a flow diagram of the operation of a hybrid traffic system in accordance with the first embodiment.

FIG. 7A is a flow diagram of the operation of a hybrid traffic system in accordance with the first embodiment. In a first step 700, the short link dataset is updated from the set of inputs. These updates may be periodic, continuous, or sporadic depending on the type of input and conditions on the roadways. The updates include providing new data for various short links in their traffic information data field. In a second step 705, a set of data analysis is performed on the short link dataset. This includes using the updated traffic information as well as historical information and statistical analysis to perform these updates. Subsequently in step 710, the results are then placed in the analytics data fields for the relevant short links.

Once the short link dataset has been updated, the results are then passed to the hybrid dataset in step 715. If there had been a normalization of the short link dataset when creating the hybrid link dataset, then that normalization would be needed to pass the results from the short link dataset to the hybrid link dataset. Alternatively, depending on the application, the hybrid link dataset may be denormalized to generate provide an easier passing of results from the short link dataset to the hybrid link dataset. This is a one to one update from short link field to hybrid link field. A complete copy may be performed or just those fields that have been updated may be copied to the hybrid dataset. Subsequently in step 720, the updated hybrid dataset is used to provide traffic information results to the outputs including analytics from the underlying short link data elements and detailed map information from the underlying long link data elements. That provided information is displayed for users as needed or requested.

Figure 7B:
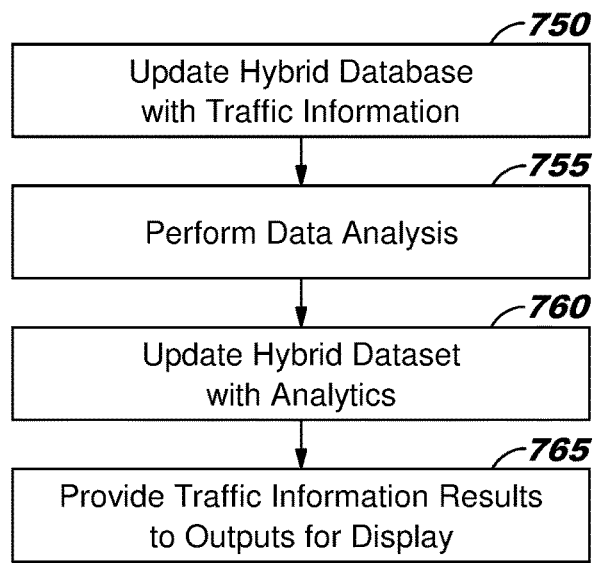

FIG. 7B is a flow diagram of the operation of a hybrid traffic system in accordance with the second embodiment. As described above with reference to FIG. 3B, this embodiment is more integrated with the traffic system than the first embodiment. In a first step 750, the hybrid dataset is updated from the set of inputs. These updates may be periodic, continuous, or sporadic depending on the type of input and conditions on the roadways. The updates include providing new data for various hybrid links in their traffic information data field. If there had been a normalization of the short link dataset when creating the hybrid link dataset, then that normalization may be needed to pass the results from the inputs to the hybrid link dataset. Alternatively, depending on the application, the hybrid link dataset may be denormalized to generate provide an easier passing of results from the inputs to the hybrid link dataset. In a second step 755, a set of data analysis is performed on the hybrid dataset. This includes using the updated traffic information as well as historical information and statistical analysis to perform these updates. Subsequently in step 760, the results are then placed in the analytics data fields for the relevant hybrid. Subsequently in step 765, the updated hybrid dataset is used to provide traffic information results to the outputs including analytics from the underlying short link data elements and detailed map information from the underlying long link data elements. That provided information is displayed for users as needed or requested.

As can be observed from this process, there is a one to one correspondence between short links and hybrid links. In addition, each hybrid link contains the same endpoints and other information as the corresponding short link. This allows for the hybrid links to be updated and processed analytically similar to the short links they correspond to. With the addition of the long link points, this also allows for better rendering of a map for display.

Figure 8:
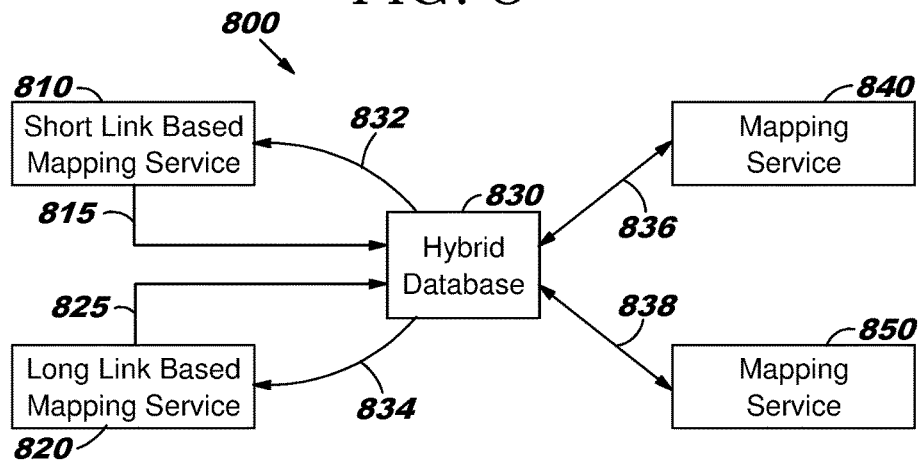
FIG. 8 is a block diagram of a network of mapping systems in accordance with a third embodiment.

FIG. 8 is a block diagram of a network of mapping systems in accordance with a third embodiment. Mapping systems may be mapping services with databases that provide maps to users in a variety of contexts. In this network 800, data 815 from a short link based database at mapping service 810 and data 825 from a long link based database at mapping service 820 are combined to create a hybrid database 830 using processes such as is described above. Once the hybrid database is created, data 832 from the hybrid database is stored in memory and may be queried or otherwise downloaded back to mapping service 810, and data 834 from the hybrid database may be queried or otherwise downloaded back to mapping service 820. Data 832 and 834 may include various linestrings such as roads, lakes, rivers, etc. Mapping service 810 may easily download data 832 from the hybrid database due to the one to one correspondence between hybrid links and short links. This data may be utilized by mapping service 810 to provide better displayed maps. Mapping service 810 may also download data 834 from hybrid database 830. However, matching that data to the appropriate long links may be difficult. For example, multiple points on multiple hybrid links may correspond to one long link in mapping service 820. In an extraction process, these correspondences may be determined and the results may be averaged across each long link. As a result, traffic information may be accessed and utilized by a long link mapping service.

Additional mapping services 840 and 850 may also access data 836 and 838 from hybrid database 830 similar to mapping services 810 and 820. Data 836 and 838 may include various linestrings such as roads, lakes, rivers, etc. If either mapping service 840 and 850 has a short link based database that utilizes that same links as mapping service 810, then the data from hybrid database 830 may be easily accessed and utilized similar to mapping service 810. However, if either mapping service 840 and 850 has long links or has short links different from the short links in mapping service 810, then an extraction process would need to be performed. As described with reference to mapping service 820, correspondences may be determined and the results may be averaged across each receiving link. Mapping services 840 and 850 may also provide additional information such as traffic activity to hybrid database 830. This would further enhance the capabilities of the hybrid database, resulting in better results for all mapping services.

Figure 9:
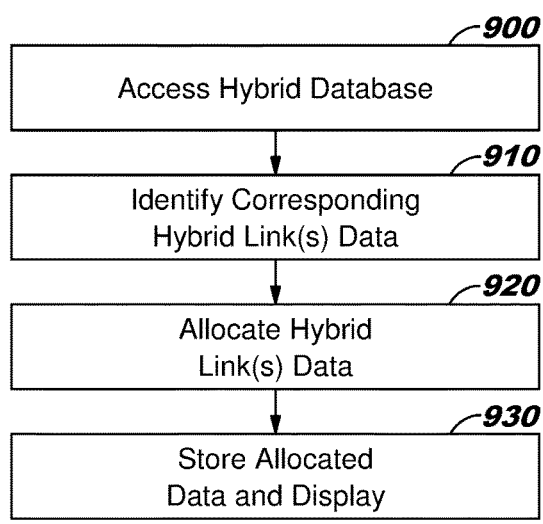
FIG. 9 is a flow diagram of the operation of an extraction process implemented by a mapping service in accordance with the third embodiment.

FIG. 9 is a flow diagram of the operation of an extraction process implemented by a mapping service in accordance with the third embodiment. In a first step 900 the hybrid database is accessed and data is extracted or otherwise downloaded. As described above with reference to FIGS. 6, 7A and 7B, a normalization step may be needed for such data transfers. Subsequently in step 910 the hybrid link or links corresponding to a link in the mapping service are identified. These hybrid link(s) may be identified by an exact or near match of hybrid link points to points in the mapping service. Once identified, in step 920, the information from the hybrid link(s) is then allocated to the corresponding mapping service link. This can include information such as traffic speed or volume. For example, if three different hybrid links correspond to a mapping service link, then the average of the three different hybrid links may be averaged as an allocation to the mapping service link. This may be a weighted average if a portion of two hybrid links and all of a third hybrid link correspond to a mapping service link. Other forms of allocation may be utilized in alternative embodiments. Finally in step 930, the allocated data is stored and may be displayed by the mapping service.

If the long links of a mapping service are too long, such as running the length of a state, then averages and other allocation of data may not be useful. As a result, such a mapping service database may need to be modified such that the long links are shortly. In addition, additional hybrid databases may be created and utilized by each mapping service in order to better match the central mapping service. One of ordinary skill in the art may utilize other such approaches to implement mapping services that utilize the information stored in the hybrid database of this embodiment.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for combining datasets. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for geospatially combining, for visual representation, line segments for tracing roads with line segments for representing traffic characteristics comprising:
    a non-transitory computer readable storage medium; and
    computer code stored on the computer readable storage medium;
    wherein the computer code includes machine readable instructions for causing a processor(s) set to perform operations including the following:
        representing a piece of a road as a first ordered series of line segments, from a first dataset of roadways representing the roads, connected in an end-to-end fashion, with: (i) the line segments of the first ordered series of line segments having a series of midpoints so that a visual representation of the connected line segments, when rendered at a scale of a map suitable for display on a display device, will appear to trace a curvature of the piece of the road, and (ii) endpoints of the first ordered series of connected line segments defining a first ordered series of points;
        representing the piece of the road as a second ordered series of line segments, from a second dataset of roadways representing the roads, connected in an end-to-end fashion, with: (i) the line segments of the second ordered series of line segments utilized for analytics with respect to its traffic characteristics, (ii) the lengths of the second ordered series of line segments are longer than the lengths of the first ordered series of line segments, and (iii) endpoints of the second ordered series of connected line segments defining a second ordered series of points;
        for each given pair of two consecutive points of the second ordered series of points corresponding to a line segment of the second ordered series of line segments, inserting a corresponding plurality of consecutive in-between points from the first ordered series of points between the pair of two consecutive points to form a hybrid ordered series of line segments to represent the piece of the road thereby replacing the corresponding line segment with the hybrid series of line segments, the hybrid ordered series of line segments linking the in-between points from the first dataset of roadways and the pair of two consecutive points from the second dataset of roadways, with each point of the plurality of in-between points having a geospatial location that is in between respective geospatial locations of the given pair of two consecutive points from the second ordered series of points;
        for each given line segment of the second ordered series of line segments, determining a first traffic characteristic value corresponding to the given line segment and a portion of the piece of the road which the given line segment represents; and
        presenting a visual representation of the piece of the road from the hybrid ordered series of line segments including: (i) a visual representation of a shape of the piece of the road based on the first ordered series of line segments, and (ii) for each given portion of the piece of the road corresponding to a given line segment of the second ordered series of line segments, mapping a visual representation of the first traffic characteristic values for the give portion of the piece of the road to the visual representation of the shape of the piece of road using the plurality of in-between points of the first ordered set of points corresponding to the pair of endpoints defined by the given line segment of the second ordered series of line segments.

2. The computer program product of claim 1 wherein for each given portion of the piece of the road corresponding to a given line segment of the second ordered series of line segments, the mapping of a visual representation of the first traffic characteristic values is performed by coloring respective portions the visual representation of the road shape represented by respective pluralities of in-between points of the first series of ordered points in a manner that is mapped to the first traffic characteristic values respectively corresponding to the pairs of endpoints of the second ordered series of line segments respectively corresponding to the pluralities of in-between points of the first series of ordered points.

3. The computer program product of claim 1 further comprising the processor(s) set, wherein the computer program product is in the form of a computer system.

4. The computer program product of claim 3 wherein for each given portion of the piece of the road corresponding to a given line segment of the second ordered series of line segments, the mapping of a visual representation of the first traffic characteristic values is performed by coloring respective portions the visual representation of the road shape represented by respective pluralities of in-between points of the first series of ordered points in a manner that is mapped to the first traffic characteristic values respectively corresponding to the pairs of endpoints of the second ordered series of line segments respectively corresponding to the pluralities of in-between points of the first series of ordered points.

5. A data processing system for geospatially combining, for visual representation, line segments for tracing roads with line segments for representing traffic characteristics comprising:
a processor set; and
a memory storing computer code including machine readable instructions for causing the processor set to perform operations including the following:
representing a piece of a road as a first ordered series of line segments, from a first dataset of roadways representing the roads, connected in an end-to-end fashion, with: (i) the line segments of the first ordered series of line segments having a series of midpoints so that a visual representation of the connected line segments, when rendered at a scale of a map suitable for display on a display device, will appear to trace a curvature of the piece of the road, and (ii) endpoints of the first ordered series of connected line segments defining a first ordered series of points;
representing the piece of the road as a second ordered series of line segments, from a second dataset of roadways representing the roads, connected in an end-to-end fashion, with: (i) the line segments of the second ordered series of line segments utilized for analytics with respect to its traffic characteristics, (ii) the lengths of the second ordered series of line segments are longer than the lengths of the first ordered series of line segments, and (iii) endpoints of the second ordered series of connected line segments defining a second ordered series of points;
for each given pair of two consecutive points of the second ordered series of points corresponding to a line segment of the second ordered series of line segments, inserting a corresponding plurality of consecutive in-between points from the first ordered series of points between the pair of two consecutive points to form a hybrid ordered series of line segments to represent the piece of the road thereby replacing the corresponding line segment with the hybrid series of line segments, the hybrid ordered series of line segments linking the in-between points from the first dataset of roadways and the pair of two consecutive points from the second dataset of roadways, with each point of the plurality of in-between points having a geospatial location that is in between respective geospatial locations of the given pair of two consecutive points from the second ordered series of points;
for each given line segment of the second ordered series of line segments, determining a first traffic characteristic value corresponding to the given line segment and a portion of the piece of the road which the given line segment represents; and
presenting a visual representation of the piece of the road from the hybrid ordered series of line segments including: (i) a visual representation of a shape of the piece of the road based on the first ordered series of line segments, and (ii) for each given portion of the piece of the road corresponding to a given line segment of the second ordered series of line segments, mapping a visual representation of the first traffic characteristic values for the give portion of the piece of the road to the visual representation of the shape of the piece of road using the plurality of in-between points of the first ordered set of points corresponding to the pair of endpoints defined by the given line segment of the second ordered series of line segments.

6. The data processing system of claim 5 wherein for each given portion of the piece of the road corresponding to a given line segment of the second ordered series of line segments, the mapping of a visual representation of the first traffic characteristic values is performed by coloring respective portions the visual representation of the road shape represented by respective pluralities of in-between points of the first series of ordered points in a manner that is mapped to the first traffic characteristic values respectively corresponding to the pairs of endpoints of the second ordered series of line segments respectively corresponding to the pluralities of in-between points of the first series of ordered points.

7. The data processing system of claim 5 further comprising the processor set, wherein the data processing system is in the form of a computer system.

8. The data processing system of claim 7 wherein for each given portion of the piece of the road corresponding to a given line segment of the second ordered series of line segments, the mapping of a visual representation of the first traffic characteristic values is performed by coloring respective portions the visual representation of the road shape represented by respective pluralities of in-between points of the first series of ordered points in a manner that is mapped to the first traffic characteristic values respectively corresponding to the pairs of endpoints of the second ordered series of line segments respectively corresponding to the pluralities of in-between points of the first series of ordered points.

9. The computer program product of claim 1 wherein combining the corresponding plurality of in-between points from the first ordered series of points with the pair of two consecutive point to represent the piece of the road forms a third ordered series of points that define a hybrid series of connected line segments.

10. The data processing system of claim 5 wherein combining the corresponding plurality of in-between points from the first ordered series of points with the pair of two consecutive point to represent the piece of the road forms a third ordered series of points that define a hybrid series of connected line segments.

11. The data processing system of claim 5 wherein the geospatial location of each pair of endpoints from the second ordered series of line segments is compared to the geospatial location of points from the first ordered series of line segments to determine which points from the first ordered series of line segments are located closest to each pair of endpoints from the second ordered series of line segments for inclusion in a corresponding hybrid line segment of the hybrid ordered series of line segments.

12. The computer program product of claim 1 wherein the geospatial location of each pair of endpoints from the second ordered series of line segments is compared to the geospatial location of points from the first ordered series of line segments to determine which points from the first ordered series of line segments are located closest to each pair of endpoints from the second ordered series of line segments for inclusion in a corresponding hybrid line segment of the hybrid ordered series of line segments.

13. A computer program product for geospatially combining, for visual representation, line segments for tracing roads with line segments for representing traffic characteristics comprising:
 a non-transitory computer readable storage medium; and
 computer code stored on the computer readable storage medium;
 wherein the computer code includes machine readable instructions for causing a processor(s) set to perform operations including the following:
 representing a piece of a road as a first ordered series of line segments, from a first dataset of roadways representing the roads, connected in an end-to-end fashion, with: (i) the line segments of the first ordered series of line segments having a series of midpoints so that a visual representation of the connected line segments, when rendered at a scale of a map suitable for display on a display device, will appear to trace a curvature of the piece of the road, and (ii) endpoints of the first ordered series of connected line segments defining a first ordered series of points;
 representing the piece of the road as a second ordered series of line segments, from a second dataset of roadways representing the roads, connected in an end-to-end fashion, with: (i) the line segments of the second ordered series of line segments utilized for analytics with respect to its traffic characteristics, (ii) the lengths of the second ordered series of line segments are longer than the lengths of the first ordered series of line segments, and (iii) endpoints of the second ordered series of connected line segments defining a second ordered series of points;
 for each given pair of two consecutive points of the second ordered series of points, combining a corresponding plurality of consecutive in-between points from the first ordered series of points with the pair of two consecutive points to form a hybrid ordered series of line segments to represent the piece of the road, the hybrid ordered series of line segments linking the in-between points from the first dataset of roadways and the pair of two consecutive points from the second dataset of roadways, with each point of the plurality of in-between points having a geospatial location that is in between respective geospatial locations of the given pair of two consecutive points from the second ordered series of points, wherein the geospatial location of each pair of endpoints from the second ordered series of line segments is compared to the geospatial location of points from the first ordered series of line segments to determine which points from the first ordered series of line segments are located closest to each pair of endpoints from the second ordered series of line segments for inclusion in a corresponding hybrid line segment of the hybrid ordered series of line segments;
 for each given line segment of the second ordered series of line segments, determining a first traffic characteristic value corresponding to the given line segment and a portion of the piece of the road which the given line segment represents; and
 presenting a visual representation of the piece of the road from the hybrid ordered series of line segments including: (i) a visual representation of a shape of the piece of the road based on the first ordered series of line segments, and (ii) for each given portion of the piece of the road corresponding to a given line segment of the second ordered series of line segments, mapping a visual representation of the first traffic characteristic values for the give portion of the piece of the road to the visual representation of the shape of the piece of road using the plurality of in-between points of the first ordered set of points corresponding to the pair of endpoints defined by the given line segment of the second ordered series of line segments.

14. The computer program product of claim 13 wherein for each given portion of the piece of the road corresponding to a given line segment of the second ordered series of line segments, the mapping of a visual representation of the first traffic characteristic values is performed by coloring respective portions the visual representation of the road shape represented by respective pluralities of in-between points of the first series of ordered points in a manner that is mapped to the first traffic characteristic values respectively corresponding to the pairs of endpoints of the second ordered series of line segments respectively corresponding to the pluralities of in-between points of the first series of ordered points.

15. The computer program product of claim 13 further comprising the processor set, wherein the data processing system is in the form of a computer system.

16. The computer program product system of claim 15 wherein for each given portion of the piece of the road corresponding to a given line segment of the second ordered series of line segments, the mapping of a visual representation of the first traffic characteristic values is performed by coloring respective portions the visual representation of the road shape represented by respective pluralities of in-between points of the first series of ordered points in a manner that is mapped to the first traffic characteristic values respectively corresponding to the pairs of endpoints of the second ordered series of line segments respectively corresponding to the pluralities of in-between points of the first series of ordered points.

17. The computer program product of claim 1 wherein combining the corresponding plurality of in-between points from the first ordered series of points with the pair of two consecutive point to represent the piece of the road forms a third ordered series of points that define a hybrid series of connected line segments.

18. The computer program product of claim 13 wherein combining a corresponding plurality of in-between points from the first ordered series of points with the pair of two consecutive points to form a hybrid ordered series of line segments to represent the piece of the road includes inserting a corresponding plurality of consecutive in-between points from the first ordered series of points between the pair of two consecutive points to form a hybrid ordered series of line segments to represent the piece of the road thereby replacing the corresponding line segment with the hybrid series of line segments.

* * * * *